United States Patent
McCardle et al.

(10) Patent No.: US 7,263,801 B2
(45) Date of Patent: Sep. 4, 2007

(54) RISER SUPPORT FOR NURSERY WIRE TABLE

(75) Inventors: Jeffery W. McCardle, Clermont, FL (US); Jerry D. Lawyer, Clermont, FL (US)

(73) Assignee: Senninger Irrigation Inc., Orlando, FL (US)

( * ) Notice: Subject to any disclaimer, the term of this patent is extended or adjusted under 35 U.S.C. 154(b) by 263 days.

(21) Appl. No.: 10/899,214

(22) Filed: Jul. 27, 2004

(65) Prior Publication Data

US 2006/0021278 A1 Feb. 2, 2006

(51) Int. Cl.
*A47G 7/00* (2006.01)

(52) U.S. Cl. .................... 47/79; 47/39; 285/139.3; 285/205

(58) Field of Classification Search ............ 285/139.3, 285/139.1, 205, 208, 209, 210; 47/39, 45, 47/48.5, 79; 239/548, 273, 266, 282, 267, 239/550, 268, 565, 269, 276, 587.4
See application file for complete search history.

(56) References Cited

U.S. PATENT DOCUMENTS

| | | | | |
|---|---|---|---|---|
| 606,842 A | * | 7/1898 | Miller | 47/79 |
| 954,269 A | * | 4/1910 | Durkee | 285/205 |
| 1,849,604 A | * | 3/1932 | Weatherhead, Jr. | 285/140.1 |
| 1,890,348 A | * | 12/1932 | Weatherhead, Jr. | 285/140.1 |
| 2,180,960 A | * | 11/1939 | Kennedy | 285/192 |
| 3,104,120 A | * | 9/1963 | Brodie et al. | 285/154.1 |
| 3,105,510 A | | 10/1963 | Demosthenes | |
| 3,606,157 A | | 9/1971 | Chapin | |
| 3,643,987 A | * | 2/1972 | DuPont | 285/205 |
| 3,686,792 A | * | 8/1972 | Barfield | 47/79 |
| 3,701,477 A | | 10/1972 | Matt et al. | |
| 4,179,038 A | * | 12/1979 | Rosan, Jr. | 285/140.1 |
| 4,183,176 A | * | 1/1980 | Barfield | 47/79 |
| 4,561,134 A | * | 12/1985 | Mathews et al. | 4/496 |
| 5,435,490 A | | 7/1995 | Machut | |
| 5,687,910 A | | 11/1997 | King | |
| 5,956,893 A | * | 9/1999 | Harrison | 47/79 |
| 5,971,444 A | * | 10/1999 | Hawkins | 285/206 |
| 6,065,693 A | | 5/2000 | Lukas | |
| 6,554,233 B1 | | 4/2003 | Ungerecht | |
| 6,729,657 B2 | * | 5/2004 | Haymon | 285/139.1 |
| 6,860,518 B2 | * | 3/2005 | Krauss et al. | 285/206 |

* cited by examiner

*Primary Examiner*—David Bochna
(74) *Attorney, Agent, or Firm*—William M. Hobby, III

(57) ABSTRACT

A riser support apparatus and method for supporting a riser pipe, having a sprinkler head thereon, on a nursery wire frame table. A riser support member and a locking member are attached together onto the nursery wire table so that a riser pipe can be attached to one side and a water supply pipe line to the other side thereof.

9 Claims, 2 Drawing Sheets

RISER SUPPORT FOR NURSERY WIRE TABLE

BACKGROUND OF THE INVENTION

The present invention relates to the irrigation of plants grown on a nursery wire table and especially to a riser support for supporting a riser pipe on a nursery wire table.

The nursery industry commonly utilizes wire tables which are tables having a table top of a wire grid using various wire sizes and grid patterns on which potted plants are placed. The plants may be placed directly on top of the wire grid or in some cases the containers can sit inside the grid squares of the wire table. The nursery plants are then irrigated by a sprinkler system having riser pipes extending above the wire table top for sprinkling and irrigating the potted plants sitting on the wire table. When the potted plants are placed within the grid squares of the wire table top, they typically utilize every other hole. On the ground level beneath the tables, a PVC pipe or poly hose is used to deliver water to the PVC riser which protrudes through the wire table approximately 12-18 inches in height. The PVC riser is usually secured to the wire table by a wire tie or some type of clamping device. There is a coupling on top of the riser in which the irrigation device, such as a sprinkler head, is attached. In many cases, a tee joint is glued onto a feeder line to which the risers are attached and are not precisely in line and can thereby cause the riser to be off-level. In addition, this system requires a significant amount of couplings and connectors and it can be quite labor intensive.

The present invention is designed to replace a traditional PVC system used on wire tables and can be installed on a wire table attached by a locking device. A small length of PVC is glued into the riser support to serve as the riser and can have an irrigation device attached to the end of the riser pipe. The flexibility of the present nursery wire adapter allows it to fit all wire tables currently used. The present apparatus and method is a significant time saver over existing configurations and can be a significant cost savings.

Prior U.S. patents that relate to nursery irrigation systems or to sprinkler riser supports include the R. D. Chapin U.S. Pat. No. 3,606,157 for a suspension spray system consisting of an elongated flexible water main suspended normally over a greenhouse bench or the like from a tensioned cable and incorporating upright communicating nozzles independently engaged with the hangers which, through movable supports, also suspend the water main from the tensioned suspension cable. The Machut U.S. Pat. No. 5,435,490 is for a multi-functional adjustable irrigation system for plant bedding and low crop environments and has a helically threaded spray fitting adapted for insertion into standard plant bedding irrigation conduits. The spray fitting is adjustable in terms of flow direction and flow rate and can provide different spray patterns. The King U.S. Pat. No. 5,687,910 is a sprinkler riser connecting apparatus and has a connector adapted to be mounted to a vertically extending stake extending upwardly from the ground and adapted to receive a vertically extending sprinkler riser pipe therein. The Lukas U.S. Pat. No. 6,065,693 is a flower bed irrigation shower for watering flowers and others plants planted in beds. The Matt et al. U.S. Pat. No. 3,701,477 has an elevated and concealed sprinkler system supported on a fence. The Demosthenes U.S. Pat. No. 3,105,510 is a riser pipe stabilizer.

The present invention is a nursery wire table riser support designed to replace the current system of installing a sprinkler pipe riser to a wire table in a nursery and clamps onto the nursery wire table wires allowing a riser pipe to be attached to the top thereof and a water line quickly attached to the riser support from beneath the wire table top.

SUMMARY OF THE INVENTION

A riser support apparatus for supporting a riser pipe on a nursery wire table has a riser support member having a base for fitting onto one side of a nursery wire table. The riser support member has a base having a riser pipe supporting member on one side thereof and an elongated water supply tube connector on the other side thereof and has a passageway through the elongated tube connector and riser pipe supporting member for the passage of water therethrough. A locking member has an opening therethrough for inserting onto the riser support member elongated tube connector from the other side of the nursery wire frame. Attaching means is provided for attaching the riser support member and locking member together onto the nursery wire table and includes external threads on the elongated water supply tube connector so that internal threads on the locking member opening can be threaded onto the riser support member. The riser support member base has a protrusion extending therefrom which fits adjacent to a wire on the wire table when the riser support member is attached with a locking member to the wire table. The method of attaching of a riser pipe to a nursery wire table includes the step of selecting a riser support and locking member in accordance with the apparatus and inserting the riser support elongated water supply tube connector through the nursery table wire from the top and through the locking member opening to thereby attach the riser support member to the locking member and to the nursery wire table and attaching a riser pipe to the riser support member and then attaching a water tube to the elongated water tube connector.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
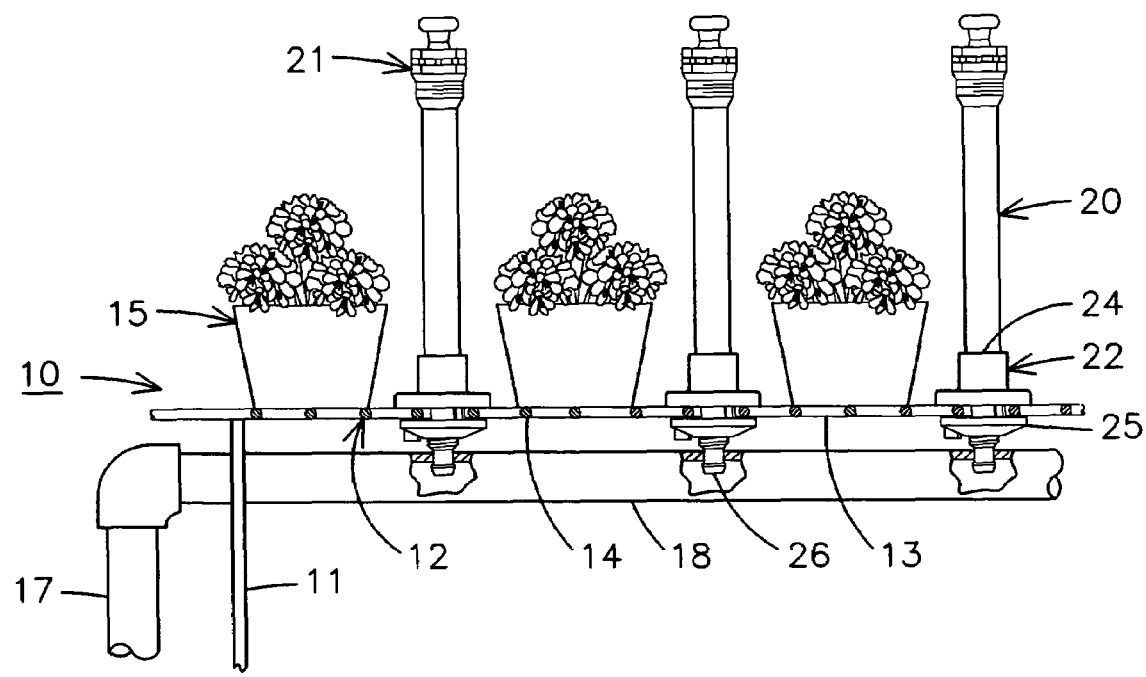
FIG. 1 is a partial sectional view of a nursery wire table having risers attached thereto in accordance with the present invention.

Referring to FIG. 1 of the disclosure, a nursery wire table 10 has legs 11 supporting a wire frame 12 which is formed of a grid of parallel wires 13 going in one direction and parallel wires 14 going at 90 degrees to form a wire grid on the table 10. The wire grid has a plurality of potted plants 15 sitting thereon and has a water line 17 connected to polytubing water line 18 which extends directly under the wire grid 12. A plurality of risers 20 each has an irrigation sprinkler 21 attached to the top thereof and is attached to the wire grid 12 by a riser support 22. The riser support 22 has a riser support member 23 having the riser support attaching portion 24. The riser support member 23 is attached to a locking member 25 below the wires 13 and 14 of the wire grid 12 and has a water supply connector 26 extending therebelow and into the water supply line 18. Water entering the inlet 17 and tubing 18 is thereby directed into the water supply tube connector 26 and then to the riser 20 for dispensing water from the sprinkler head 21 onto the potted plants 15.

Figure 2:
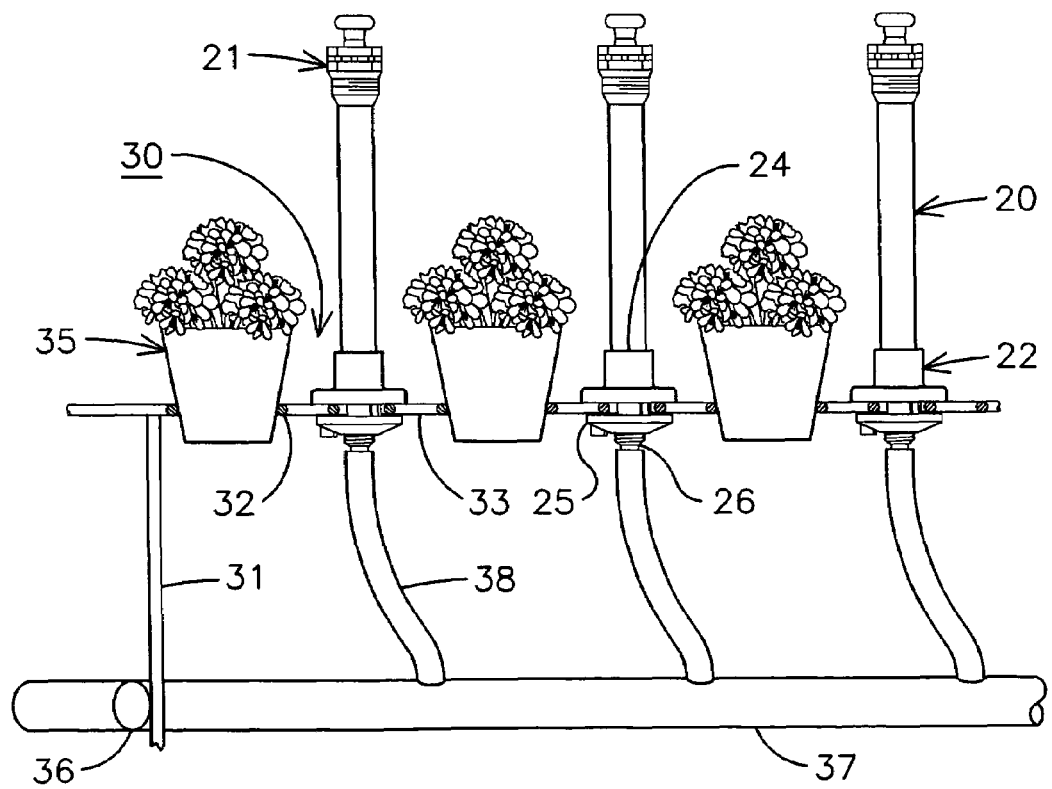
FIG. 2 is a second embodiment of a nursery wire frame table having risers attached thereto in accordance with the present invention.

FIG. 2 has a partial view of a slightly modified nursery wire frame table 30 having legs 31 and a larger wire grid 32 having parallel wire grid members 33 extending in one direction and perpendicular wire grid members 34 running in the other direction. The grid 32 is larger than that of FIG. 1 so that the larger potted plants 35 fit down between the wires 33 and 34. The riser 20 with the sprinkler head 21 and the riser support 22, are the same as illustrated in FIG. 1. A water inlet pipe 36, however, feeds into a poly-tubing 37 which may be located in the ground and which has a plurality of feeder tubes 38 running therefrom and connected directly to the water supply tube connector 26.

Figure 3:
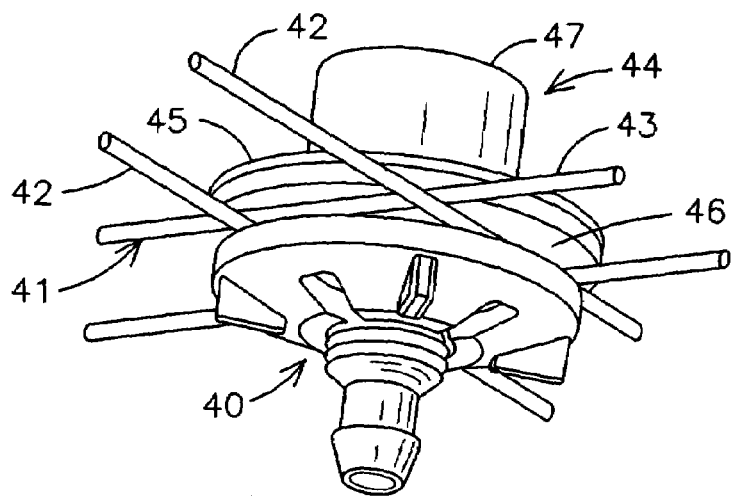
FIG. 3 is a perspective view of the riser support attached to the wires of a wire table.
Figure 4:
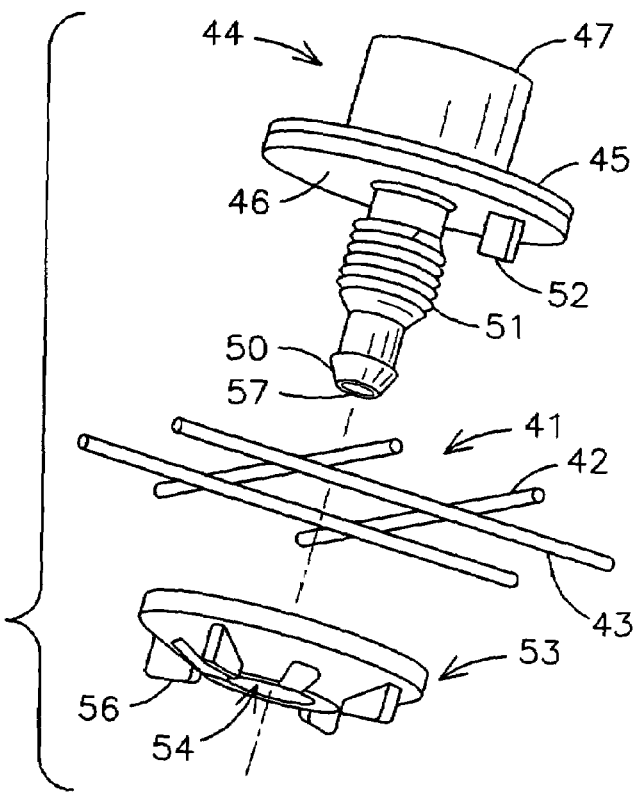
FIG. 4 is an exploded view of the riser support of FIG. 3.
Figure 5:
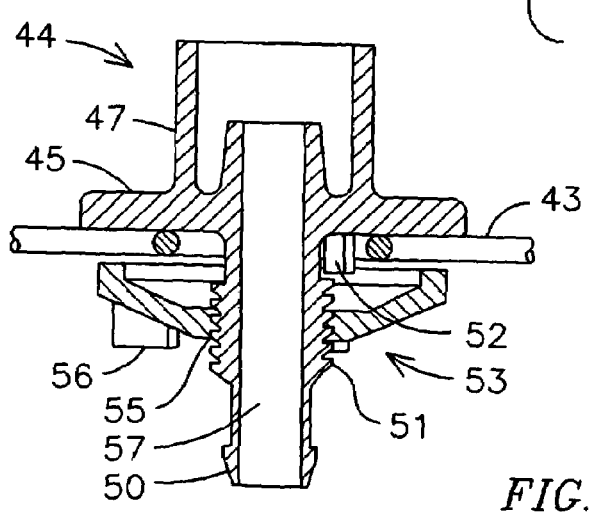
FIG. 5 is a sectional view of an attached riser support in accordance with FIGS. 3 and 4.

Turning to FIGS. 3, 4 and 5, the riser support 40 is illustrated attached to a nursery wire table 41 having wires 42 running in one direction and 43 running in the other direction to form the gridwork for the table top 41. The riser support 40 has the riser support member 44 having a base 45 with a generally flat surface 46 pressed against the wires 42 and 43. A riser pipe supporting member 47 on one side is sized to receive a riser pipe 20 of FIGS. 1 and 2 therein. A riser support member 44 has an elongated water supply tube connector 48 extending out the other end from the base 45 and has a tube connecting barb 50 on the end thereof and has a plurality of external threads 51 thereabove. The base 45 flat surface 46 also has a protrusion 52 thereon for fitting between the wires 42 and 43. The riser support has a locking member 53 having an opening 54 extending therethrough and has internal threads 55 therein. The locking member 53 also has a plurality of gripping surfaces 56 extending from the bottom thereof for gripping when threading the locking member 53 onto the external threads 51 from beneath the wire grid 41 so as to clamp the riser support member 44 onto the nursery table wire 41, as seen in FIGS. 3 and 5. A passageway 57 extends through the elongated water supply tube connector 48 and into the riser pipe supporting member 47 to form a passageway through the riser support for delivering water to the riser and irrigation sprinkler head.

In operation, a riser support 40 is selected and the riser supporting member 44 placed on top of the wire grid 41 with the face 45 flat bottom 46 sitting on the wire screen and the elongated water supply tube connector 48 extending through the grid 41. Locking member 53 is then slipped onto the elongated water supply tube connector 48 from the bottom of the grid 41 and threaded onto the threads 51 to clamp the riser support member 44 onto the screen 41. Thereafter, the water line connecting portion 50 can be connected directly into water tubing, as seen in FIG. 1, or can be connected to a feeder tube 38, as seen in FIG. 2, to supply water through the riser support 22 into the riser and into the sprinkler head for sprinkling and irrigating the potted plants 15 or 35.

It should be clear at this time that a riser support for supporting a riser pipe on a nursery wire table has been provided and a method of attaching a riser pipe to a nursery wire table. However, it should be clear that the present invention is not to be limited to the forms shown which are to be considered illustrative rather than restrictive.

We claim:

1. A riser on a nursery wire table comprising:
   a nursery wire table having a nursery wire frame;
   a riser having a riser pipe and said riser support member, said riser support member having a base fitting onto one side of said nursery wire frame, said base having a riser pipe supporting member on one side thereof and an elongated water supply tube connector on the other side thereof and having a passageway therethrough for the passage of water therethrough into said riser pipe, said riser having a locking member on the other side of said nursery wire frame and having an opening therethrough sized for said riser support member elongated tube connector to pass through; and
   attaching means attaching said riser support member and said locking member together onto said nursery wire frame;
   whereby the riser is attached to the nursery wire table and to a water supply tube for supplying water to said riser.

2. The riser in accordance with claim 1 in which said attaching means includes a fastener portion on said elongated water supply tube connector.

3. The riser in accordance with claim 2 in which said attaching means includes a fastener portion on said locking member.

4. The riser in accordance with claim 3 in which said attaching means fastener portion on said elongated water supply tube connector includes a plurality of serrations.

5. The riser in accordance with claim 4 in which said attaching means fastener portion on said locking member includes serration engaging tabs for engaging said elongated water supply tube connector serrations when said water supply tube connector is inserted through said locking member opening.

6. The riser in accordance with claim 1 in which said riser support member base has a protrusion extending therefrom positioned to extend through said nursery wire table nursery wire frame when said riser support member is attached to said locking member to thereby hold said riser support member relative to said wire.

7. The riser in accordance with claim 6 in which said riser support member base has a generally flat surface for sitting on said nursery wire frame frame.

8. The riser in accordance with claim 7 in which said locking member base has a generally flat surface for engaging said nursery wire from the opposite side from said riser support member.

9. The riser in accordance with claim 8 in which said riser support member base has a plurality of gripping handles thereon.

* * * * *